May 9, 1939.  J. B. SMITH  2,158,023
AUTOMATIC WEIGHING AND REJECTING MACHINE
Filed Nov. 19, 1937  4 Sheets-Sheet 1

INVENTOR.
John Buchanan Smith
BY
Shreve, Crown & Gordon
ATTORNEY.

May 9, 1939.　　　　J. B. SMITH　　　　2,158,023
AUTOMATIC WEIGHING AND REJECTING MACHINE
Filed Nov. 19, 1937　　　4 Sheets-Sheet 2
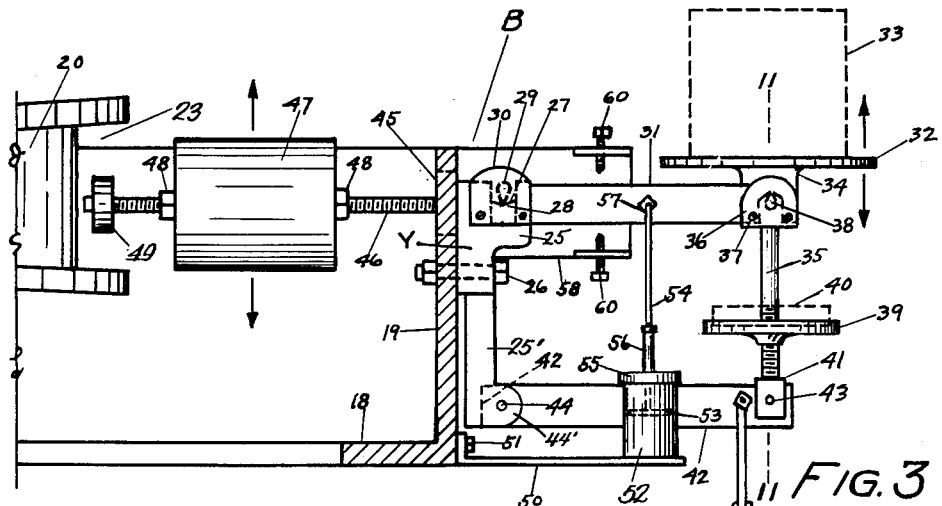
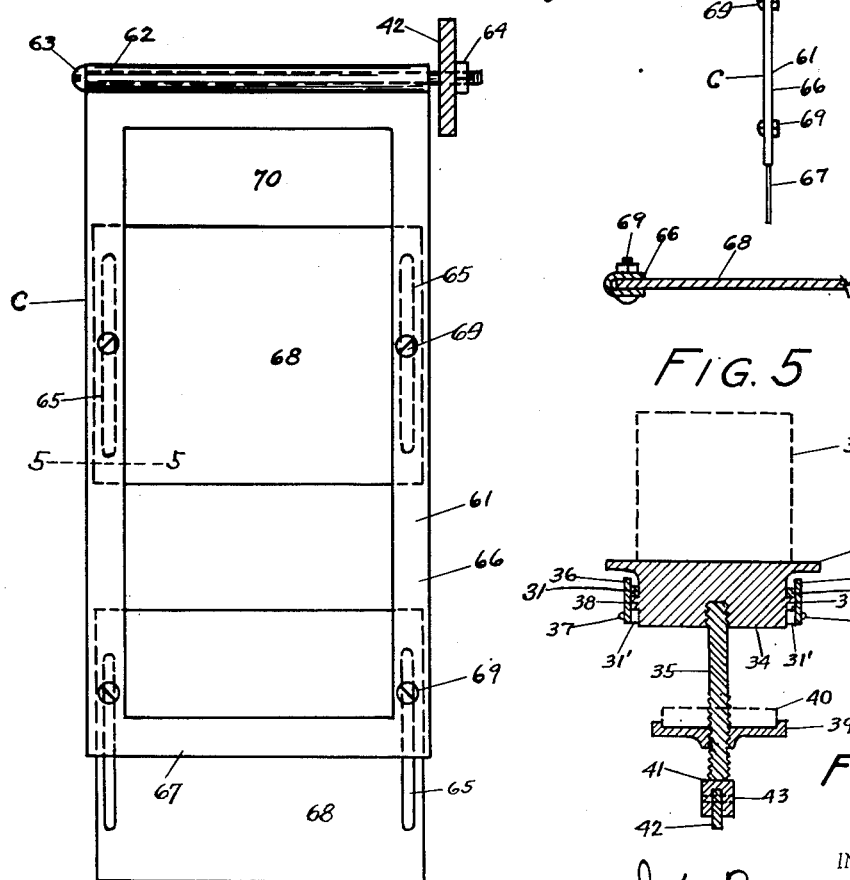
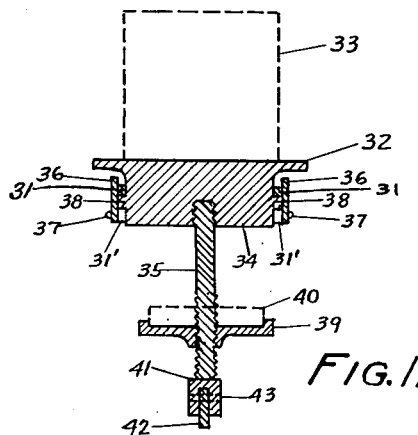
INVENTOR.
John Buchanan Smith
BY Shreve, Crown + Gordon
ATTORNEY.

May 9, 1939.  J. B. SMITH  2,158,023
AUTOMATIC WEIGHING AND REJECTING MACHINE
Filed Nov. 19, 1937  4 Sheets-Sheet 3

INVENTOR.
John Buchanan Smith
BY
Shreve, Crowe + Gordon
ATTORNEY.

May 9, 1939.   J. B. SMITH   2,158,023
AUTOMATIC WEIGHING AND REJECTING MACHINE
Filed Nov. 19, 1937   4 Sheets-Sheet 4

INVENTOR.
John Buchanan Smith
BY Shreve, Crow + Gordon
ATTORNEY.

Patented May 9, 1939

2,158,023

UNITED STATES PATENT OFFICE 2,158,023

AUTOMATIC WEIGHING AND REJECTING MACHINE

John Buchanan Smith, Griffin, Ga., assignor to Pomona Products Company, Griffin, Ga.

Application November 19, 1937, Serial No. 175,533

18 Claims. (Cl. 209—121)

Generically this invention relates to weighing machines but it is more particularly directed to the type for automatically and successively weighing a continuously advancing train of objects and selectively distributing them according to their respective weights.

An important object of this invention is the provision of a machine for automatically weighing each article delivered to the machine and means operable by the weighing mechanism to deliver the respective articles, over or under a predetermined weight at one point, and the articles of the proper weight at a different point.

Another important object of this invention is the provision of a machine comprising a rotating mechanism including a plurality of weighing units adapted to receive each article as it is delivered to the machine and means controlled by the respective units for diverting the articles over or under weight and delivering those only of a predetermined weight to the primary delivery point, or automatic receiving mechanism.

A still further object of this invention is the provision of an automatic weighing machine having a plurality of weighing units adapted to receive and individually weigh the respective cans, delivering only those of the proper weight to the primary distributing point, said machine being adjustable to different sized cans, having guide track means cooperating with the weighing units to prevent balancing movement of the units at moment of delivery of the cans thereto, but permitting free balancing movement of each weighing unit during its progressive travel through said guide and electrical ejector means controlled by the respective weighing units through a photoelectric means for diverting cans of improper weight prior to their reaching the primary delivery point, said weighing units, their supporting rotating mechanism, and electrical control and ejector mechanisms being of simplified construction.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 3 is a fragmentary view of the semi-circular table and track and rotary spider element partly in section and side elevation of the scales operatively positioned.

Fig. 4 is a side elevation of the interceptor element.

Fig. 5 is a section through the frame and panel taken on the line 5—5 of Fig. 4.

Fig. 11 is a sectional view taken on the line 11—11 of Fig. 3.

Figure 1:
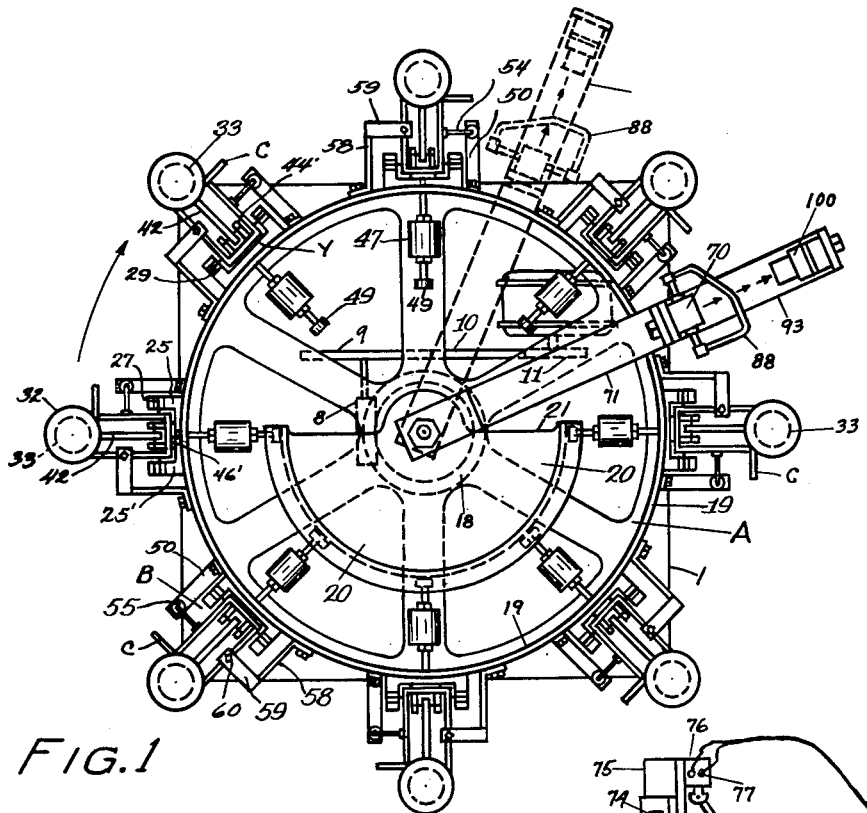
Fig. 1 is a top plan view of my improved automatic can weighing machine.
Figure 2:
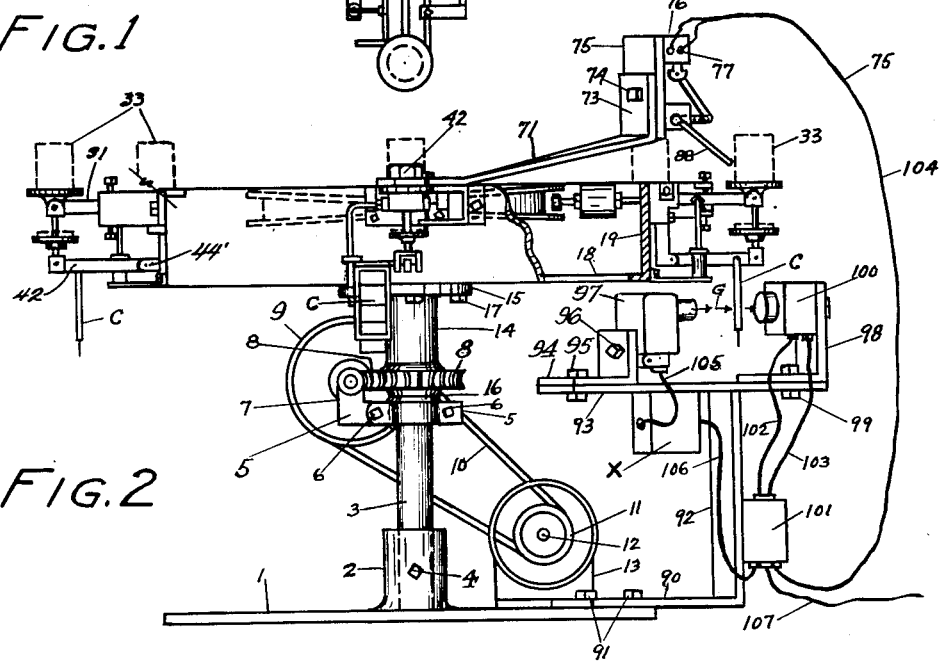
Fig. 2 is a side elevation partly in section.
Figure 6:
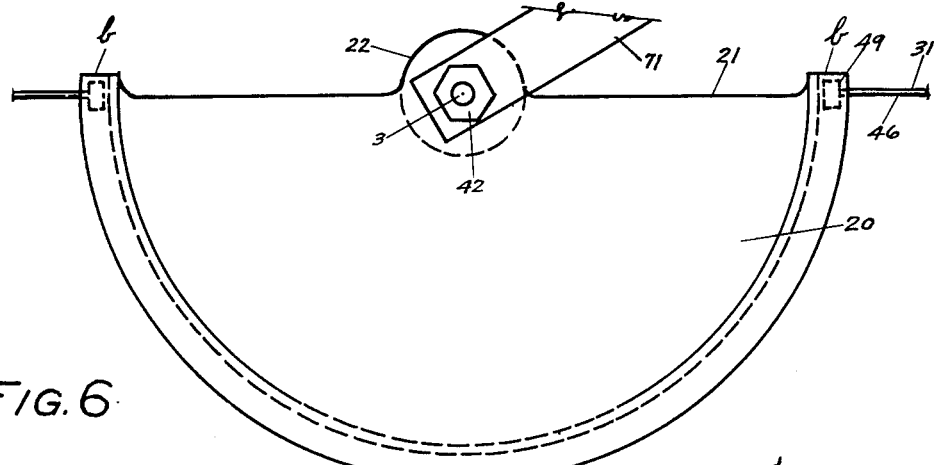
Fig. 6 is a top plan view of the semi-circular table.
Figure 7:
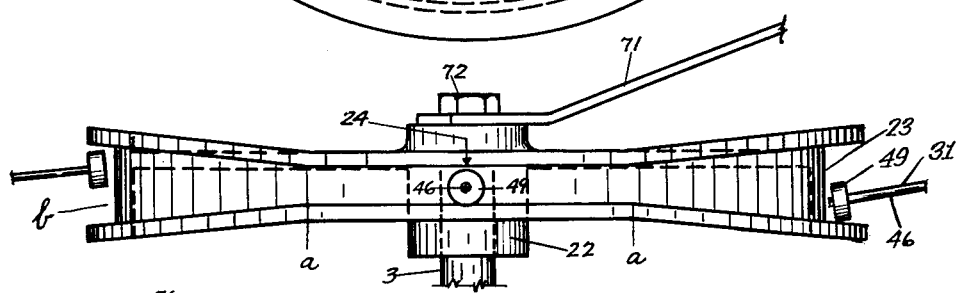
Fig. 7 is a front edge view of Fig. 6 showing the guide track and roller elements.
Figure 8:
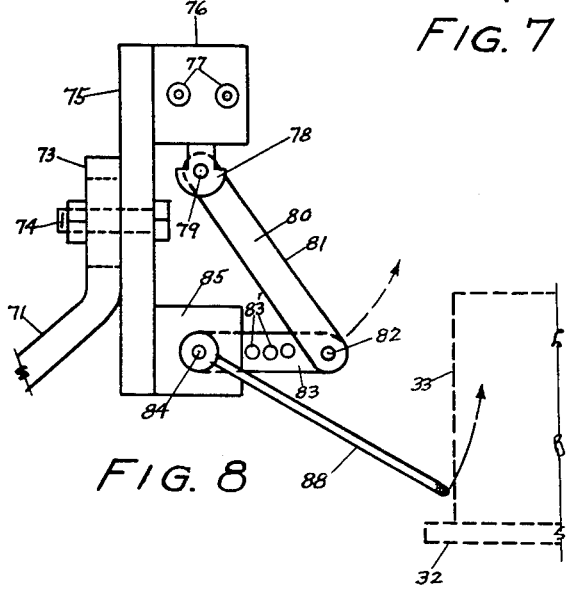
Fig. 8 is a side elevation of the solenoid and ejector.
Figure 9:
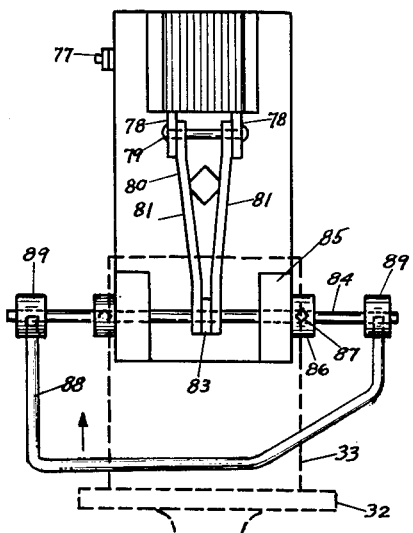
Fig. 9 is a front elevation of Fig. 8.
Figure 10:
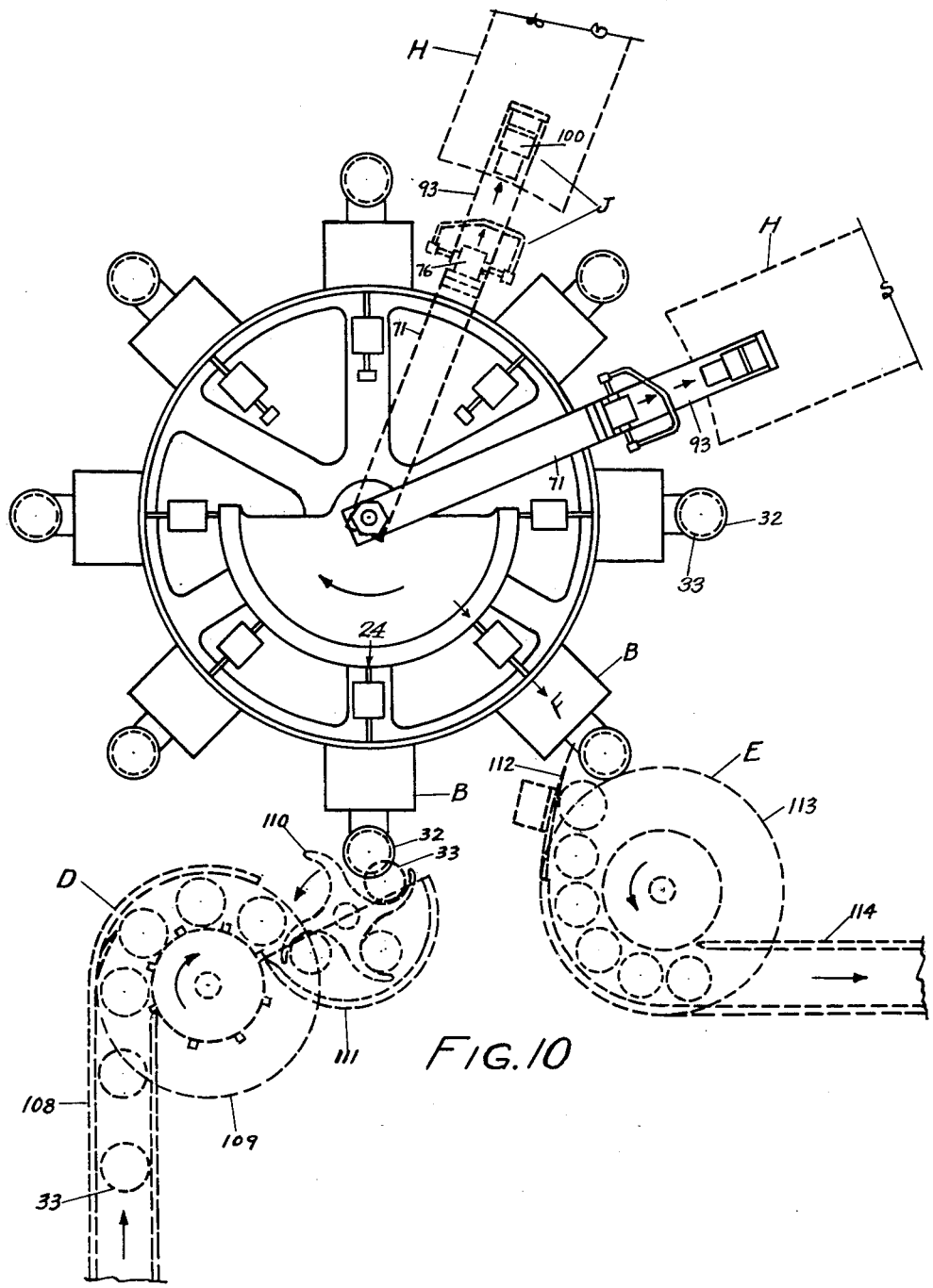
Fig. 10 is a diagrammatic top plan view of the machine and showing the arrangement of feed and discharge units.

Weighing machines for filled cans and the like with which I am familiar have proven deficient in many respects, for instance, being incapable of correctly weighing each article as it is delivered to the machine in a continuous stream, discarding those differing in weight from a predetermined standard and at a rapid speed, too complicated in construction, and where photo-electric means is employed having too intricate mechanical and electric wiring construction and not employing a positive ejector means for the articles of improper weight, not having balancing devices for weighing each individual article of simplified construction, and adjustable to different sized cans or articles, and it was to overcome such deficiencies and to provide an automatic rotary weighing mechanism including a plurality of article receiving and weighing devices adjustable to different sized cans and other articles, of simple construction, means associated with the rotary element and co-acting with the balancing or weighing devices adapted to prevent weighing movement of each weighing device or unit at the moment of receiving the can to be weighed, but permitting free weighing movement thereof during its subsequent rotary travel, and magnet means for positively operating a can ejector element by means of a photo-electric element controlled by the respective weighing devices, that I designed the machine forming the subject matter of this invention.

In the illustrated embodiment characterizing this invention there is shown a base 1, having an upstanding socket 2 adapted to receive the lower end of standard 3 rigidly secured by set screw 4. Mounted on said standard is a supporting thrust bearing 5 secured by bolts 6 and having an upstanding portion 7 in which is journaled a worm 8, on the free end of which, is mounted pulley 9 connected by belt 10 with pulley 11 mounted on drive shaft 12 of motor 13 suitably mounted on base 1 for driving said screw. Mounted on standard 3 is a sleeve fitting 14 formed at its upper end with a laterally extending flange table supporting base 15 and at its lower bearing end 16 supported in thrust bearing 5. Supported on flange 15 and suitably secured by bolts 17 is a spider-like turntable 18 formed with a circumferential flange or vertical wall 19. Mounted on the upper end of standard 3 is a semi-circular table element 20 formed along its straight edge 21 with a hub portion 22 extending beyond and with its center coincident with said straight line and adapted to receive the upper end of standard 3 to which it is rigidly secured in any suitable manner. Table 20 is formed in its semi-circular edge with a roller guide track 23 the edge walls of which extend in parallellism from a central point 24 in opposite directions to points a—a and then diverge outwardly to the widened ends of the track b—b for a purpose presently appearing.

Mounted exteriorly of turntable flange 19 is a series of equi-spaced balancing or scale devices B and as these devices are exactly similar, for brevity of description one only of which will now be described in detail.

Each of the scales comprises a supporting bracket member Y formed with spaced arms 25 and bolted to flange 19 by bolts 26, said arms 25 are formed in their upper surfaces with slots as at 27 and terminating in V-shaped bottom portions 28 and constituting pivot points for the knife edge of the heart-shaped lugs 29 formed on opposite sides adjacent one end of the substantially U-shaped balance arm 31 of the scales, the ends of slots 27 being closed by the detachable plates 30 suitably secured on opposite sides of arm 25. A platform 32 adapted to support the can 33 or other article to be weighed is formed with a hub portion 34 adapted to seat between the free ends of bar 31 and is threadedly countersunk in its bottom surface to receive the threaded upper end of rod 35, and the opposite sides of arm 31 adjacent their free ends are slotted as at 31' similar in configuration to slots 27 of arms 25, except that they are reversed. Said slots 31' are adapted to receive the knife edge of lugs 38 formed on the opposite sides of hub 34 and are adapted to support the opposite legs of arm 31. Suitably secured to said legs 31 over the ends of slots 27 are plates 36 secured by screws or other suitable means 37 similar to plates 30 of arms 25. Threadedly mounted on said rod 35 is weight shelf 39 adapted to support the weight or weights 40. Suitably secured to the lower end of rod 35 is a U-shaped member 41 adapted to receive one end of lower arm 42 to which it is threadedly secured by pin 43, the other end of arm 42 is pivoted by pin 44 between the ears 44' of the centrally disposed depending bracket arm 25' formed integral with bracket Y. Bracket Y and flange or wall 19 is slotted as at 45 through which extends threaded rod portion 46, one end of which is threadedly connected to hub 46' of balance arm 31 midway of its legs and forming a continuation thereof. Threadedly mounted on rod portion 46 is a counter-balance weight 47 secured against displacement during the operation of the machine by lock nuts 48, and mounted on the free end of rod 46 is ball-bearing roller 49 adapted to travel in track 23, for a purpose presently appearing.

Mounted on supporting bracket 50 secured to the lower edge of flange 19 by screw bolt 51 is the stabilizer 52 comprising piston 53 connected to piston rod 54 extending through closure 55 formed with piston rod guide 56, the upper end of said piston rod being suitably connected to arm 31 secured by nut 57, said stabilizer tending to steady the movement of balance arm 31 during rotary travel of the scales and operation of the machine.

Suitably secured to the upper edge of flange 19 is the arm-like plate 58 formed adjacent its free end with laterally extending parallel ears 59 in which are threadedly mounted the adjusting set screws 60 constituting stops to limit the movement of arm 31.

The rotary spider element A carrying the circumferentially disposed balancing devices or scales B on each of which is supported a can 33 or other article to be weighed is adapted to rotate in the direction of the arrow or clockwise, and in order to control the photo-electric mechanism for effecting the ejection of cans or articles of improper weight, there is projecting from the lower arm 42 in advance of the respective weighing devices B, an intercepter element C comprising a rectangular frame 61 formed at its upper end with a tubular portion 62 adapted to receive supporting rod 63, the threaded end of which extends through arm 42 and is secured by nut 64.

Said frame is bent upon itself to form slots 65 in the side frame members 66, the end frame section 67 being open at its lower edge to receive the panel elements 68 slidably adjustable in slots 65. Said panels 68 are slotted at their ends and are secured in adjusted position with respect to said frame by bolts 69 to control the openings 70, for a purpose directly more fully appearing.

A supporting arm 71 has one end secured to the upper end of hub portion 22 of stationary table 20 by nut 72 threadedly engageable on standard 3 and extends outwardly and upwardly to a point slightly beyond the vertical flange 19 of the rotary table A and terminates in a vertical portion 73. Secured to portion 73 by bolt 74 is an upright support 75, and suitably secured to the upper end of support 75 is a solenoid or electrically controlled magnet 76, including binding posts 77 and plunger elements 78 connected by bolt 79 and link element 70 comprising bars 81 with their upper ends journaled on bolt 79 and their lower ends connected by pin 82 to the free end of bell crank arm 83. The other end of bell crank 83 is keyed or otherwise connected to shaft 84 journaled in spaced bearing lugs 85 suitably connected to the lower end of support 75. The shaft 84 extends beyond the lugs 85 and its longitudinal movement with respect to said lugs is prevented by collars 86 secured by set screws 87. The ejector or kicker arm 88 is substantially U-shaped with one leg shorter than the other and with the free ends of the legs suitably secured in collar elements 89, said collars or hub members being keyed or otherwise suitably mounted on the ends of shaft 84, so that upward movement of plunger elements 78 through link 80 and bell crank 83 will cause the free end of ejector 88 to move upwardly in the direction of the arrow into contact with can 33 thereby ejecting said can into container H. Holes 83' in member 83 effect adjustment of the throw of ejector 83.

Mounted below the rotatable scale supporting table or turret element A is a supporting base 90 connected to base 1 by bolts 91 and which extends outwardly from said base and upwardly forming supporting standard 92. A horizontal member 93 substantially central of its length is supported by standard 92 to which it is suitably secured. Mounted on the inner end of support 93 is a supporting bracket 94 connected to said support by bolt 95 and mounted on said bracket secured by bolt 96 is an electric lamp 97. Mounted on the opposite end of supporting element 93 is a bracket 98 secured by bolt 99 and mounted on said bracket in alignment with said light is a photo-electric cell or other form of light sensitive device 100. Operatively associated with cell 100 is the electrical apparatus including distributor box 101 suitably mounted on standard 92, connected to said cell by conductors 102 and 103, and said distributor box is connected to binding posts 77 of solenoid 75 by conductor 104. The light 97 is connected by conductor 105 to transformer X suitably mounted on support 93, and leading from the distributor box to said transformer is conductor 106, said distributor box being connected to a source of power not shown, by conductor 107.

Suitably mounted adjacent said machine A is an automatic can feeding mechanism D comprising a can feed track 108 adapted to deliver the cans 33 to a rotary feed table 109 and to a star wheel mechanism 110 cooperating with a stationary guide 111, said wheel being timed to deliver a can to each of the weighing mechanisms as the roller 49 reaches the loading point 24 of guide track 23 so that the weighing mechanism will be held against vertical movement as the can is delivered thereto.

Positioned adjacent to mechanism D and adapted to receive the cans of correct weight as the weighing device again approaches the feeding mechanism D, there is located a can removing mechanism E comprising a take-off guide element 112 and cooperating rotary delivery table 113 which delivers the can to chute or conveyor 114 or other suitable receiver. Mechanisms D and E being of conventional construction it is not deemed necessary to illustrate their construction in detail.

With further reference to the weighing devices B it will be observed that not only is the scale device adjustable longitudinally by counterweight 47 and vertically by weight support 39 threadedly adjustable on rod 35 in conjunction with weights 40, but wobbling and fluttering of the balancing mechanism is prevented during operation of the scales and during their rotary travel by the stabilizer 52. Therefore not only are the scales adjustable as above stated in accordance with different weights or sizes of articles to be weighed but they are further adjustable as to different sized articles by virtue of the movable panels 68 of the interceptor C, since the interceptor may be adjusted in accordance with a predetermined weight to vary the openings 70 so that the light beam will be intercepted and the electro-mechanical ejector mechanism will be controlled by the photo-electric element in accordance with the weight carried by said scales.

While the operation of the device would seem to be clear from the above description it might be well to further state that the driving power is transmitted from motor 13 through belt 10, pulley 9, worm 8, worm gear 8', sleeve 14, to rotary table element A thereby effecting rotation of said table and weighing devices B. While the cans or articles to be weighed may be fed to the machine manually it is preferable that they be fed automatically, and while any suitable automatic means may be used, the feeding mechanism D including star wheel 110 is preferably employed which is of conventional construction. It will be observed that the widened end (b) of track 23 adapted to receive and guide roller 49 of balance arm 31 to the delivery point F for the cans of correct weight, irrespective of the weight of the can or whether any article is carried by the scale D or not, and by virtue of the formation of the track, when the scale reaches point 24 the roller 49 will be positively held against weighing or vertical movement of the arm 31 as the can 33 is delivered to the scale platform 32, and as roller 49 passes point 24 the can 33 is delivered to platform 32 and balance arm 31 will be held against vertical movement and will be so maintained sufficiently to insure its being substantially balanced by the time it reaches point (a) and enters the widened portion of said track. As a respective scale approaches ejector arm 88 interceptor C carried by and in advance of said scale passes intermediate lamp 97 and light sensitive device 100 and as it passes through the light beam, if the can on the scale is of the proper weight, the predetermined opening 70 in interceptor C will not cut off the light beam from cell 100 and therefore the scale will continue to position F where the article is delivered by guard 112 to the delivery and removing mechanism E as will be well understood. However, if as a respective scale B approaches arm 71 and ejector mechanism 88, if the can is not of proper weight, that is, either too heavy or too light, one of the panels 68 will intercept or cut off the light beam G from cell 100 instantly causing solenoid 76 to operate ejector arm 88 to remove the can 33 to be received in container H.

It is therefore apparent that all cans of improper weight are diverted before reaching the primary delivery point F for cans of proper weight. It will be noted that if it is desired to deliver cans of light weight to one point and those of overweight to another point an additional solenoid ejector unit and photo-electric assembly in conjunction therewith may be employed as shown in dotted lines at J, as will be well understood.

From the above it is apparent that I have designed a simplified automatic weighing machine comprising few parts, embodying unique weighing devices and simple guide and stabilizing control means during loading and rotary travel of the scales, a unique, simple and adjustable interceptor, and light sensitive apparatus responsive to the weight carried by the scale elements and controlling the positive ejector mechanism, said machine adapted to operate at rapid speeds, manufacturable at a reasonable cost, versatile in its adaptive use, adjustable to different sized cans or other articles to be weighed, and efficient for the purposes intended.

Although in practice I have found that the form of my invention illustrated in the accompanying drawings and referred to in the above description as the preferred embodiment, is the most efficient and practical; yet realizing the conditions concurrent with the adoption of my invention will necessarily vary, I desire to emphasize that various minor changes in details of construction, proportion and arrangement of parts, may be resorted to within the scope of the appended claims without departing from or sacrificing any of the principles of this invention.

Having thus described my invention, what I desire protected by Letters Patent is as set forth in the following claims:

1. A weighing and rejecting apparatus comprising a rotary element, a weighing device carried by the rotary element, said device having loading and ejecting positions, means coacting with said device to permit its free swinging movement in ejecting position but rigidly retaining said device in its loading position, and ejector member, an electro-magnet for controlling said ejector member, a light, a photo-electric element controlled by the rays from said light, and an interceptor member mounted on and in advance of said weighing device for intercepting said light rays, whereby articles of improper weight are removed from the weighing device when the latter reaches ejecting position.

2. A weighing and rejecting apparatus comprising a rotary element, a plurality of weighing devices carried by said element, said devices having delivering and ejecting positions, means coacting with said devices to permit their free swinging movement in ejecting position, but rigidly retaining said devices in their delivery position, means for automatically delivering articles to be weighed continuously to said device, each article successively to a weighing device, an ejector member, an electro-magnet controlling said ejector member, a lamp, a photo-electric element controlled by the light beam from said lamp controlling said electro-magnet, an interceptor member mounted on and in advance of each of said weighing devices for intercepting the light beam from said photo-electric element, whereby the articles of improper weight are removed from the weighing devices when the latter reach ejecting position.

3. A weighing and rejecting machine comprising a rotary element, a plurality of weighing devices carried by said element, said devices having delivering and ejecting positions, means coacting with said devices to permit their free swinging movement in ejecting position but rigidly retaining said devices in their delivery position, means for automatically conveying the articles to be weighed and delivering an article to each weighing device successively, means for rejecting articles of incorrect weight from the weighing mechanisms, including an electro-magnet controlled ejector member, a light sensitive-cell operatively associated with said electro-magnet and means comprising a member influenced by said weighing mechanism to intercept the light rays to said cell, said interceptor member having an opening adjustable to control the operation of said ejector member.

4. A weighing and rejecting machine comprising a rotary element, a quadrant-shaped guide associated with said element including vertically spaced flange elements constituting a single track narrow at a loading point located central of the quadrant and widened at its ends, a weighing device carried by said rotary element including a balancing mechanism terminating in a roller member adapted to traverse said track, the latter rigidly maintaining said mechanism in loading position while permitting its free swinging movement within balancing limits throughout its widened portions, a photo-electric device including a light beam, an electro-mechanical ejector means controlled by said photo-electric element, and an interceptor element carried by said weighing device and adapted to intercept the light beam in accordance with the weight carried by the weighing device, whereby articles of improper weight are eject prior to their reaching the point of normal delivery from the weighing device.

5. A weighing and rejecting machine comprising a rotary element, a quadrant-shaped guide associated with said element including vertically spaced flange elements constituting a single track, said flanges extending in parallelism in opposite directions from a loading point located central of the quadrant and gradually diverging to the ends of said track, a weighing device carried by said rotary element including a balancing mechanism normally free swinging within balancing limits and terminating in a roller member adapted to traverse said track, said parallel flanges preventing swinging movement of said mechanism during travel of said roller between the parallel flanges, a photo-electric element including a light beam, an electro-mechanical ejector means controlled by said photo-electric device, and an interceptor element carried by said weighing device and adapted to intercept the light beam in accordance with the weight carried by said weighing device, whereby articles of improper weight are ejected prior to their reaching the normal point of delivery from the weighing device.

6. A weighing and rejecting machine comprising a rotary element, a quadrant shaped guide including vertically spaced flange elements constituting a single track, said flanges extending in parallelism in opposite directions from a loading point located central of the quadrant and gradually diverting to the ends of said track, a series of weighing devices carried by said rotary element, each including an article carrying balancing mechanism normally free swinging within balancing limits and terminating in a roller member adapted to traverse said track, said parallel flanges preventing swinging movement of said mechanisms during travel of said rollers between the parallel portions of said flanges, a continuous article delivering means adapted to deliver an article to each weighing device successively, a photo-electric element including a light beam, an electro-mechanical ejector means controlled by said photo-electric element, and an interceptor member carried by each of said weighing devices and adapted to intercept the light beam in accordance with the weight carried by its weighing device, whereby articles of improper weight are ejected.

7. A weighing and rejecting machine comprising a rotary element, a quadrant shaped stationary guide associated with said element including a single track having a narrow portion at a loading point located central of the quadrant and gradually widening from said portion to its ends, a weighing device carried by said rotary element including an article carrying balancing mechanism normally free swinging within balancing limits and terminating in a roller member adapted to traverse said track, said narrow portion preventing swinging movement of said balancing mechanism, a lamp, a photo-electric element controlled by the light beam from said lamp, an electro-mechanical ejecting means controlled by said photo-electric element, and an interceptor element carried by and in advance of said weighing device adapted to intercept the light beam in accordance with the weight carried by said weighing device, whereby articles of improper weight are ejected from said weighing device.

8. A weighing and rejecting machine comprising a rotary element, a quadrant shaped stationary guide associated with said element including a single track having a narrow portion at a loading point located central of the quadrant and gradually widening from said portion to its ends, a series of weighing devices carried by said rotary element, each including an article carrying balancing mechanism normally free swinging within balancing limits and terminating in a roller member adapted to traverse said track, said narrow portion preventing swinging movement of said weighing element during travel of the rollers therethrough, while said widened portions permitting their free swinging movement, a lamp, a photo-electric element controlled by the light beam from said lamp, an electro-mechanical ejecting means controlled by said photo-electric element, an interceptor element carried by and in advance of each of said weighing devices adapted to intercept the light beam in accordance with the weight carried by its weighing device, whereby articles of improper weight are ejected from said weighing devices.

9. A weighing and rejecting machine comprising a rotary element, a quadrant shaped stationary guide associated with said element including a single track having a narrow portion at a loading point located central of the quadrant and widening from said portion to its ends, a weighing device carried by said rotary element including an article carrying balancing mechanism normally free swinging within balancing limits terminating in a roller member adapted to traverse said track, said narrow portion preventing swinging movement of said mechanism and said widened portions permitting swinging movement of said mechanism, a lamp, a photo-electric element controlled by the light beam from said lamp, an electro-magnetically controlled means including a retractable element connected with and adapted to operate an ejector member, said means controlled by said photo-electric element, and an interceptor element depending from and in advance of said weighing device adapted to intercept said light beam in accordance with the weight carried by the weighing device, whereby articles of improper weight are ejected from said weighing device.

10. A weighing and rejecting machine comprising a rotary element, a quadrant shaped guide associated with said element including a single track having a narrow portion at a point substantially central of its length and widening from said portion to its ends, a weighing device carried by said rotary element including an article carrying balancing mechanism normally free swinging within balancing movements and terminating in a roller member adapted to traverse said track, said narrow portion preventing and said widened portions permitting swinging movement of said weighing element during travel of the roller respectively therethrough, a lamp, a photo-electric element controlled by the light beam from said lamp, an electro-magnetically controlled means including a retractable element connected with and adapted to operate an article ejector member, said means controlled by said photo-electric element, and an interceptor element depending from and in advance of said weighing device adapted to intercept said light beam in accordance with the weight carried by the weighing device, whereby an article of improper weight is ejected from said weighing device.

11. A weighing and rejecting machine comprising a rotary element, a quadrant shaped guide associated with said element including a single track narrow at a point central of its length and widening from said portion to its ends, a weighing device carried by said rotary element including an article carrying balancing mechanism normally free swinging within balancing limits and terminating in a roller member adapted to traverse said track, said narrow portion preventing the swinging movement of said weighing element during travel of the roller therethrough, a photo-electric device including a light beam, an electro-mechanical ejector means controlled by said photo-electric element, and an interceptor element carried by said weighing device having an opening adjustable in accordance with a predetermined weight and adapted to effect the interception of said light beam in accordance with the weight carried by the weighing device, whereby an article of improper weight is ejected from said weighing device.

12. A weighing and rejecting machine comprising a rotary element, a quadrant shaped guide associated with said element including a single track narrow at a point central of its length and widening from said portion to its ends, a weighing device carried by said rotary element including an article carrying balancing mechanism normally free swinging within balancing limits and terminating in a roller member adapted to traverse said track, said narrow portion preventing the swinging movement of said weighing element during travel of the roller therethrough, a photo-electric device including a light beam, an electro-mechanical ejector means controlled by said photo-electric element, and an interceptor element carried by said weighing device having an adjustable opening adapted to effect the interception of said light beam in accordance with the weight carried by the weighing device, whereby an article of improper weight is ejected from said weight device.

13. A weighing and rejecting machine comprising a rotary element, a quadrant shaped guide associated with said element including a single track narrow at a point central of its length and widening from said portion to its ends, a weighing device carried by said rotary element including an article carrying balancing mechanism normally free swinging within balancing limits and terminating in a roller member adapted to traverse said track, said narrow portion preventing the swinging movement of said weighing element during travel of the roller therethrough, a photo-electric device including a light beam, an electro-mechanical ejector means controlled by said photo-electric element, and an interceptor element carried by said weighing device having an opening adjustable in accordance with different sized articles to be weighed and adapted to effect interception of said light beam in accordance with the weight carried by the weighing device, whereby an article of improper weight is ejected from said device.

14. A weighing and rejecting machine comprising a rotary element, a plurality of weighing devices carried by said element, said devices being normally free swinging and having delivering and ejecting positions, means coacting with said devices to permit their free swinging movement in ejecting position but rigidly retaining said devices in their delivery position, each weighing device adapted to carry successively an article to be weighed, means for rejecting articles of incorrect weight from each weighing device including an electro-magnetically controlled ejector member, means for adjusting the throw of said ejector member, a light sensitive-cell controlling said electro-magnet, and means comprising a member influenced by said weighing mechanism to intercept the light rays to said cell for controlling operation of the latter.

15. A weighing and rejecting machine comprising a rotary element, a quadrant shaped guide associated with said element including a single track having a narrow central portion and widened end portions, a weighing device carried by said rotary element comprising an article carrying balancing mechanism normally free swinging within balancing limits and terminating in a roller member adapted to traverse said track, said narrow portion preventing swinging movement of said balancing mechanism and said widened portion permitting swinging movement thereof, means for effecting longitudinal and vertical adjustment of said balancing mechanism, a photo-electric device including a light beam, an electro-mechanical ejector means controlled by said photo-electric element, an interceptor element carried by said weighing device adjustable in accordance with different sized articles and adapted to intercept said light beam in accordance with the weight carried by the weighing device, whereby an article of improper weight is ejected from said device.

16. A weighing and rejecting machine comprising a rotary element, a weighing device carried by said element, a quadrant shape guide associated with said element including a single track having a narrow central portion and widened end portions, a weighing device comprising an article carrying balancing mechanism normally free swinging within balancing limits and terminating in a roller member adapted to traverse said track, said narrow portion preventing and said widened portions permitting swinging movement of said balancing mechanism during the travel of said roller respectively therethrough, means for effecting longitudinal and vertical adjustment of said balancing mechanism, means for stabilizing the movement of said balancing mechanism during the rotative movement of said rotary element, a photo-electric device including a light beam, an electro-mechanical ejector means controlled by said photo-electric element, an interceptor element carried by said weighing device adjustable in accordance with different sized articles and adapted to intercept said light beam in accordance with the weight carried by the weighing device, whereby an article of improper weight is ejected from said device.

17. A weighing and rejecting machine comprising a rotary element, a weighing device carried by said element, a quadrant shaped guide associated with said element including a single track having a narrow central portion and widened end portions, a weighing device comprising an article carrying balancing mechanism normally free swinging within balancing limits and terminating in a roller member adapted to traverse said track, said narrow portion preventing and said widened portion permitting swinging movement of said balancing mechanism during the travel of said roller, respectively, therethrough, means for stabilizing the movement of said balancing mechanism during rotative movement of said rotary element, a photo-electric device including a light beam, an electro-mechanical ejector means controlled by said photo-electric element, an interceptor element carried by said weighing device and having an opening adjustable in accordance with different sized articles and adapted to effect interception of said light beam in accordance with the weight carried by the weighing device, whereby an article of improper weight is ejected from said device.

18. A weighing and rejecting machine comprising a rotary element, a weighing device including an article carrying balancing mechanism normally free swinging within balancing limits and carried by said rotary element, means adapted to prevent swinging movement of said balancing mechanism as said article is delivered to said weighing mechanism, means for stabilizing the movement of said balancing mechanism during rotative movement of said rotary element, a photo-electric device including a light beam, an electro-mechanical ejector means controlled by said photo-electric element, an interceptor element carried by said weighing device and having an opening adjustable in accordance with different sized articles and adapted to effect interception of said light beam in accordance with the weight carried by the weighing device, whereby an article of improper weight is ejected from said device.

JOHN BUCHANAN SMITH.